(12) United States Patent
Kieffer

(10) Patent No.: US 12,043,004 B1
(45) Date of Patent: Jul. 23, 2024

(54) FABRICATION APPARATUSES AND METHODS

(71) Applicant: Plastics Unlimited, Inc., Preston, IA (US)

(72) Inventor: Terry Kieffer, Preston, IA (US)

(73) Assignee: Plastics Unlimited, Inc., Preston, IA (US)

( * ) Notice: Subject to any disclaimer, the term of this patent is extended or adjusted under 35 U.S.C. 154(b) by 824 days.

(21) Appl. No.: 17/075,438

(22) Filed: Oct. 20, 2020

Related U.S. Application Data

(63) Continuation of application No. 14/265,047, filed on Apr. 29, 2014, now Pat. No. 10,807,320.

(60) Provisional application No. 61/816,905, filed on Apr. 29, 2013.

(51) Int. Cl.
*B29C 70/36* (2006.01)

(52) U.S. Cl.
CPC ..................................... *B29C 70/36* (2013.01)

(58) Field of Classification Search
None
See application file for complete search history.

(56) References Cited

U.S. PATENT DOCUMENTS

| | | |
|---|---|---|
| 2,857,626 A | 10/1958 | Wagner et al. |
| 3,084,391 A | 4/1963 | John |
| 4,178,406 A | 12/1979 | Russell |
| 4,201,823 A | 5/1980 | Russell |
| 4,692,111 A | 9/1987 | Wagner |
| 4,902,215 A | 2/1990 | Seemann, III |
| 5,023,042 A | 6/1991 | Efferding |
| 5,052,906 A | 10/1991 | Seemann |
| 5,059,377 A | 10/1991 | Ashton et al. |
| 5,129,813 A | 7/1992 | Shepherd |
| 5,131,702 A | 7/1992 | Matthysse et al. |
| 5,281,388 A | 1/1994 | Palmer et al. |
| 5,433,165 A | 7/1995 | McGuiness et al. |
| 5,439,631 A | 8/1995 | Schneider et al. |
| 5,702,663 A | 12/1997 | Seemann |
| 5,721,034 A | 2/1998 | Seemann, III et al. |
| 5,932,256 A | 8/1999 | Mandish |
| 6,406,659 B1 | 6/2002 | Lang et al. |
| 6,551,091 B1 | 4/2003 | Bryant et al. |
| 6,555,045 B2 | 4/2003 | Mcclure et al. |
| 6,609,633 B1 | 8/2003 | Dyble et al. |
| 6,676,882 B2 | 1/2004 | Benson et al. |
| 7,160,498 B2 | 1/2007 | Mataya |
| 7,931,852 B2 | 4/2011 | Kieffer |
| 2002/0149134 A1 | 10/2002 | Hemphill et al. |

(Continued)

FOREIGN PATENT DOCUMENTS

WO 2012026980 A3 6/2012

*Primary Examiner* — Monica A Huson
*Assistant Examiner* — Kelsey C Grace
(74) *Attorney, Agent, or Firm* — BrownWinick Law Firm; Christopher A. Proskey

(57) ABSTRACT

One embodiment of a method according to the present disclosure may use a fixture with one or more boot recesses formed therein. An embedded member may be engaged with a boot and placed in a boot recess. Substrate lay-up may be placed around all or a portion of the embedded member and an outer member may be positioned over the substrate lay-up. A cover may be positioned over the outer member and engaged with the fixture. The pressure within an interior portion of the fixture may be reduced to less than ambient pressure and resin may be introduced to interact with the substrate lay-up and allowed to cure.

9 Claims, 16 Drawing Sheets

(56) References Cited

U.S. PATENT DOCUMENTS

| | | |
|---|---|---|
| 2002/0185785 A1 | 12/2002 | Thrash et al. |
| 2004/0265406 A1 | 12/2004 | Lorenz et al. |
| 2008/0308960 A1 | 12/2008 | Rydin et al. |
| 2010/0012268 A1 | 1/2010 | Nobis et al. |
| 2010/0112117 A1 | 5/2010 | Ross et al. |
| 2010/0239865 A1 | 9/2010 | Kallinen |
| 2011/0174426 A1 | 7/2011 | Weimer et al. |
| 2012/0175824 A1 | 7/2012 | Fergusson |
| 2012/0298296 A1 | 11/2012 | Thompson et al. |
| 2013/0241100 A1 | 9/2013 | Lownsdale et al. |
| 2016/0107398 A1 | 4/2016 | Taylor |

FABRICATION APPARATUSES AND METHODS

CROSS REFERENCE TO RELATED APPLICATIONS

This patent application is a continuation of and claims priority from U.S. patent application Ser. No. 14/265,047 filed on Apr. 29, 2014, which application claimed priority from provisional U.S. Pat. App. No. 61/816,905 filed on Apr. 29, 2013, all of which applications are incorporated by reference herein in their entireties.

FIELD OF INVENTION

This present disclosure relates to fiberglass-reinforced parts, and more specifically, to fiberglass-reinforced parts have other elements embedded therein.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

AUTHORIZATION PURSUANT TO 37 C.F.R. § 1.171 (d)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BRIEF DESCRIPTION OF THE FIGURES

In order that the advantages of the invention will be readily understood, a more particular description of the invention briefly described above will be rendered by reference to specific embodiments illustrated in the appended drawing. Understanding that these drawings depict only typical embodiments of the invention and are not therefore to be considered limited of its scope, the invention will be described and explained with additional specificity and detail through the use of the accompanying drawings.

Figure 1:
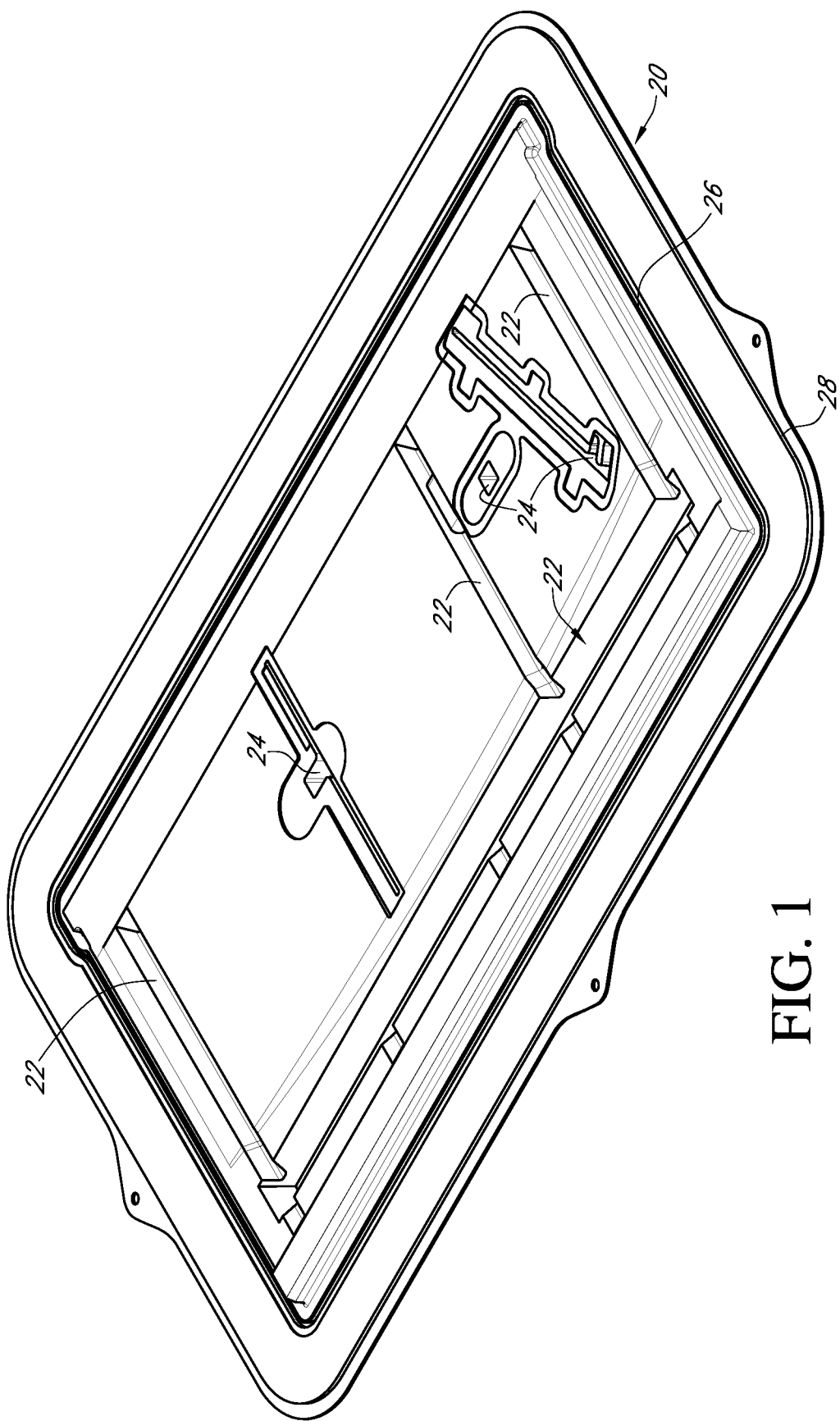
FIG. 1 is a perspective view of the top surface of one embodiment of a fixture that may be used in accordance with the present disclosure.

| DETAILED DESCRIPTION-TABLE OF THE ELEMENTS | |
|---|---|
| ELEMENT DESCRIPTION | ELEMENT # |
| Part | 10 |
| Substrate lay-up | 12 |
| Resin | 14 |
| Fixture | 20 |
| Outlet | 21 |
| Trough | 22 |
| Inlet | 23 |
| Boot recess | 24 |
| Hose | 25 |
| Inner seal | 26 |
| Outer seal | 28 |
| Embedded member | 30 |
| Frame | 32 |
| Ear | 34 |
| Extending portion | 36 |
| Boot | 38 |
| Cover | 40 |
| Interior surface | 42 |
| Sealing portion | 42a |
| Outer member | 50 |
| Flange | 52 |
| Inlet location | 52a |

DETAILED DESCRIPTION OF AN ILLUSTRATIVE EMBODIMENT

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

Figure 7A:
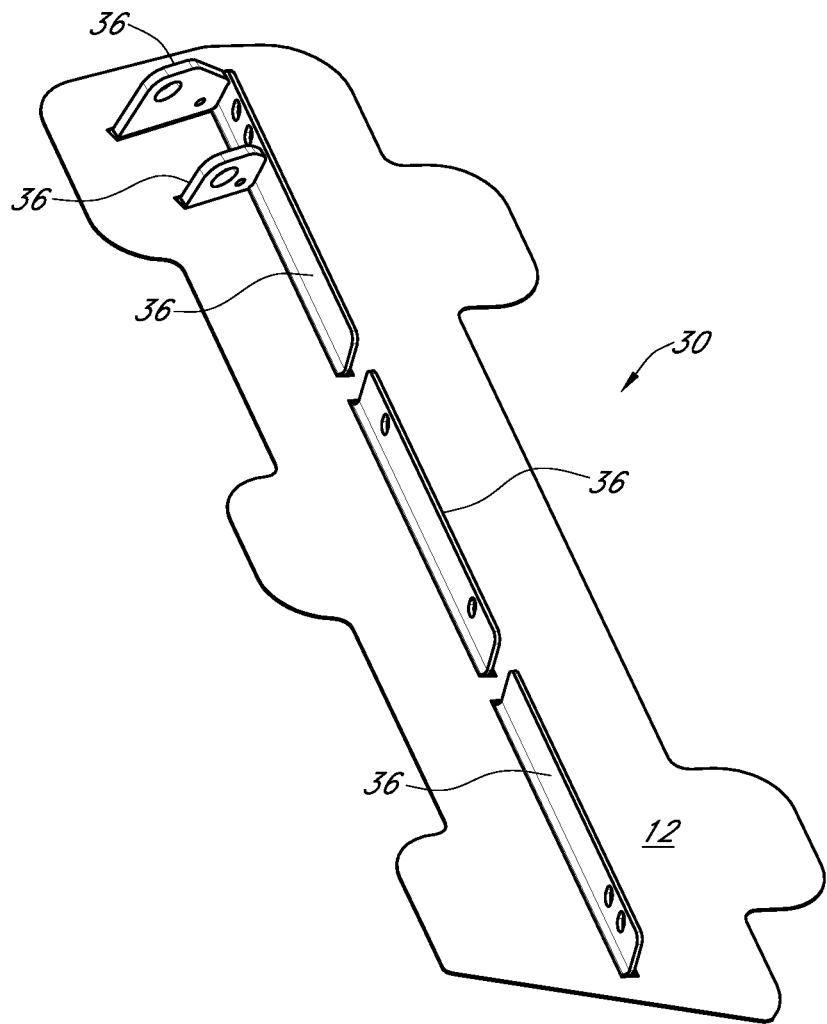
FIG. 7A is a perspective view of the top side of one embodiment of an embedded member with a portion of substrate lay-up positioned thereon, which embedded member may be positioned in a fixture.
Figure 7B:
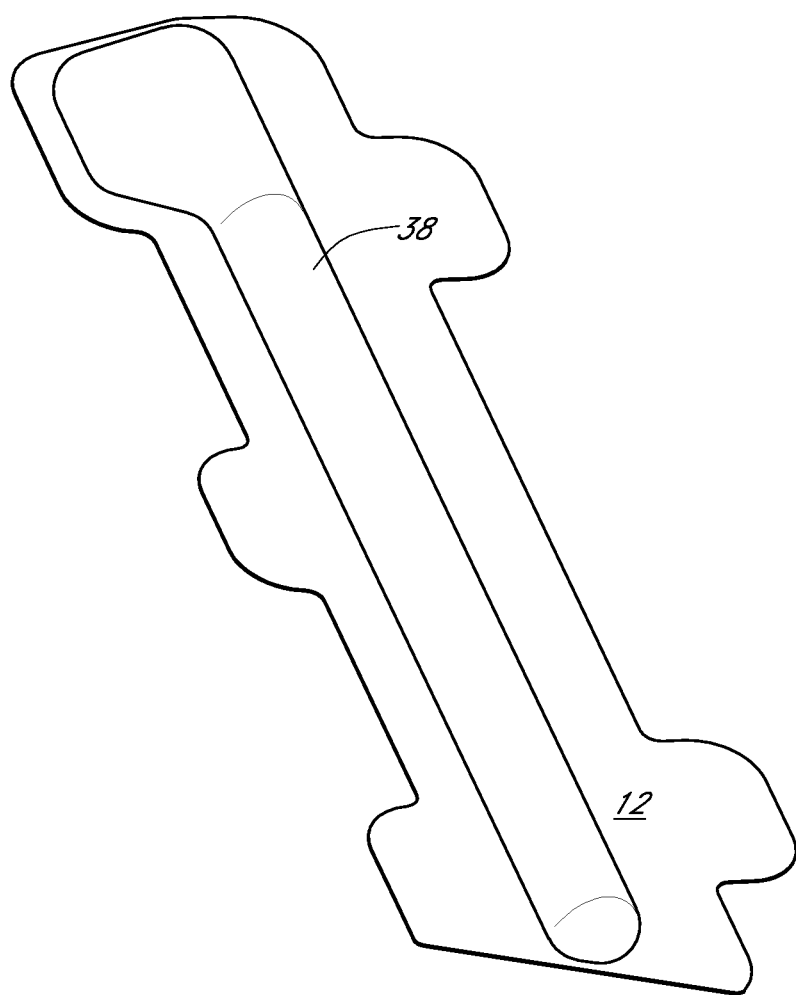
FIG. 7B is a perspective view of the top side of the embodiment of an embedded member from FIG. 7A with a boot positioned over a portion thereof.
Figure 12B:
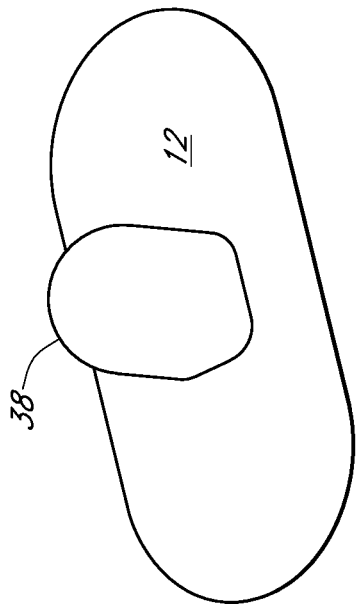
FIG. 12B is a perspective view of the top side of the embodiment of an embedded member from FIG. 12A with a boot positioned over a portion thereof.
Figure 12A:
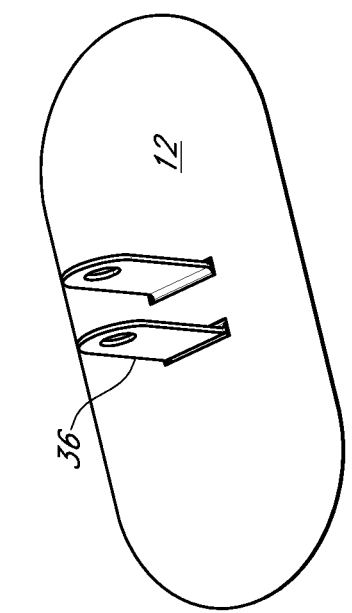
FIG. 12A is a perspective view of the top side of another embodiment of an embedded member with a portion of substrate lay-up positioned thereon, which embedded member may be positioned in a fixture.

Referring now to the figures, wherein like reference numerals designate identical or corresponding parts throughout the several views, FIG. 1 provides a perspective view of a first illustrative embodiment of a fixture 20 that may be used in accordance with the present disclosure. The present disclosure relates to apparatuses and methods that may be useful in the fabrication of a part 10 having an embedded member 30. FIG. 7 provides a perspective view of the top side of a first illustrative embodiment of an embedded member 30 that may be used in accordance with the present disclosure. FIG. 12 provides a perspective view of a top side of a second illustrative embodiment of an embedded member 30 that may be used in accordance with the present disclosure. Although the present disclosure shows a specific number of specific embedded members 30 located at specific locations of the part 10, the scope of the present disclosure is in no way limited by the specific number, location, dimensions, and/or configuration of any of the embedded members 30 present in a specific embodiment of a part 10, fixture 20, and/or method used to fabricate a part 10.

Figure 9A:
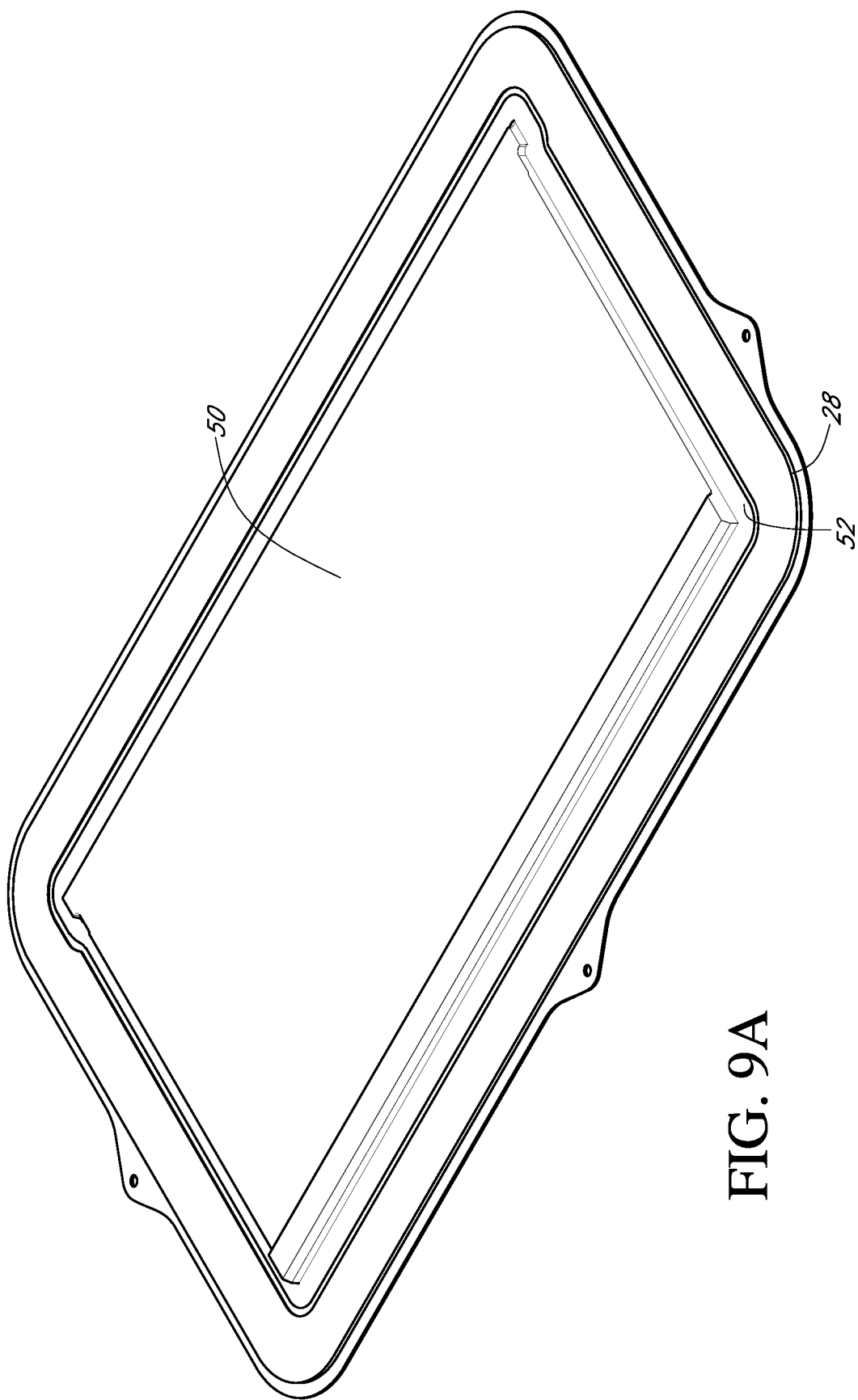
FIG. 9A is a perspective view of the fixture shown in FIGS. 1-6 with an outer member placed over the second layer of substrate lay-up.

In the illustrative embodiment, the part 10 may be formed with an outer member 50 (shown clearly in FIGS. 9 & 14) on a surface thereof that may be visible at most times when the finished part 10 is in use, which surface may be referred to as the "A side" of the part 10, wherein the opposite surface may be referred to as the "B side" of the part 10. The part 10 may be a reinforced polymer composite, such as shown in the illustrative embodiment. Accordingly, the outer member 50 may be formed by any method that is appropriate for the application of the part 10, including but not limited to thermoforming, injection molding, or extrusion. Furthermore, the part 10 may be composed of any material that is suitable for the particular application of the part 10, including but not limited to polypropylene, polymethylmethacralate, polystyrene, abs, acrylic, polyethylene, or butadiene.

Figure 8:
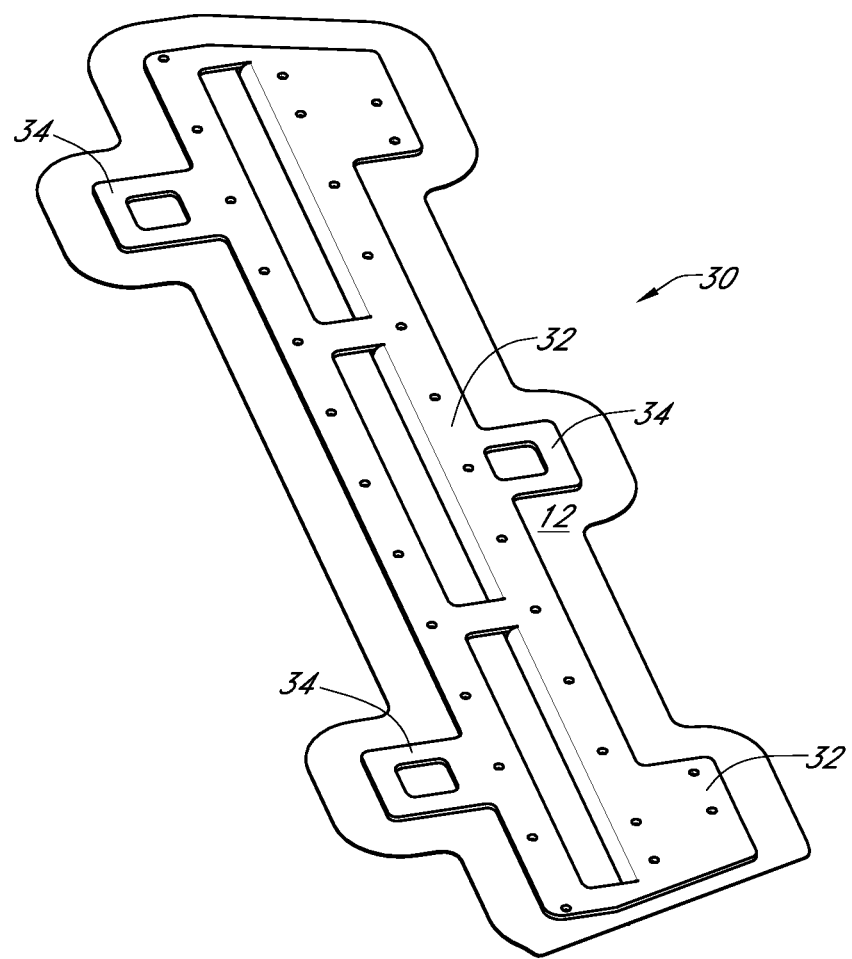
FIG. 8 is a perspective view of the bottom side of the embodiment of an embedded member with a portion of substrate lay-up positioned thereon from FIG. 7.

As shown in FIG. 7, the embedded member 30 may include a plurality of extending portions 36, which may be void of substrate lay-up 12. The opposite side of the embedded member 30 from FIG. 7 is shown in FIG. 8, which provides a perspective view of the bottom side of the first illustrative embodiment of an embedded member 30. Accordingly, the embedded member 30 may include a frame 32 and one or more ears 34. Substrate lay-up 12 configured to mimic the periphery of the frame 32 may be positioned on a first side of the frame 32 with openings to allow for any extending portions 36.

Figure 13:
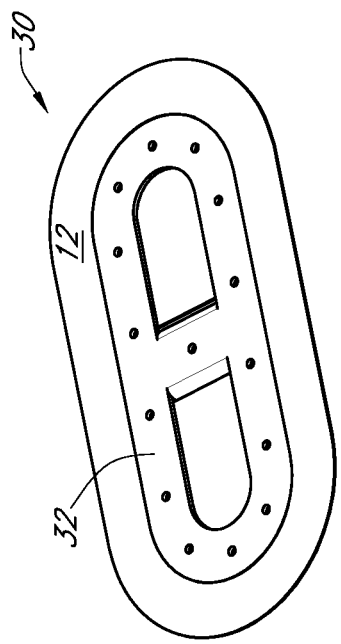
FIG. 13 is a perspective view of the bottom side of the embodiment of an embedded member with a portion of substrate lay-up positioned thereon from FIG. 12.

The bottom side of the second illustrative embodiment of an embedded member 30 is shown in perspective in FIG. 13. The second illustrative embodiment may include at least one extending portion 36, which also may be void of substrate lay-up 12. Additionally, the second illustrative embodiment of an embedded member 30 may include a frame 32. As with the first illustrative embodiment of an embedded member 30, substrate lay-up 12 configured to mimic the periphery of the frame 32 may be positioned on a first side of the frame 32 with openings to allow for any extending portions 36.

A boot 38 may be placed over one or more extending portions 36 of an embedded member 30 as shown in FIG. 1. The illustrative embodiment of a boot 38 shown in FIG. 1 may be configured specifically for engagement with the first illustrative embodiment of an embedded member 30 shown in FIGS. 7 & 8, such that the boot 38 engages all extending portions 36 of that embedded member 30. The boot 38 may be configured to seat within a boot recess 24 formed in a fixture 20 on the main interior surface thereof, which surface may also be formed with one or more troughs 22 as further described below. Generally, a boot recess 24 may be formed as a depression, indentation, and/or other feature formed in the main interior surface of the fixture 20. In the illustrative embodiment of a fixture 20 pictured herein, each boot recess 24 generally is formed as a specifically sized and shaped indentation having a specific length, width, and depth at various positions of the indentation.

The seating of the boot 38 within a boot recess 24 of the fixture 20 allows the embedded member 30 to be located in the same position with respect to the part 10 in an extremely repeatable and precise manner, and may also eliminate the need for secondary attachment of additional fixtures, brackets, etc. as described below. A boot 38 may also prevent ingress and/or egress of resin 14, substrate lay-up 12, and/or other material from an area between the embedded member 30 and the boot 38 and/or from an area between the boot 38 and the fixture 20. It is contemplated that for many embodiments, the boot 38 may be constructed of a material that is generally impermeable to and/or inert with respect to the resin 14 and/or any other fluids, chemicals, etc. that may be required for fabricating the part 10. Such materials include but are not limited to silicone, polyurethane, other polymers and/or synthetic materials, natural rubber, fibrous materials, and/or combinations thereof.

The fixture 20 may also include one or more troughs 22 for additional embedded members 30. In the illustrative embodiment, some embedded members 30, such as those shown in FIGS. 7, 8, 12, and 13, may be formed of steel or other metallic alloys, and some may be formed of foam or other synthetic materials. However, the specific material of construction and/or configuration of any embedded member 30 in no way limits the scope of the present disclosure. Additionally, the fixture 20 may be constructed of any suitable material and/or combination thereof, including but not limited to cellulosic materials, polymer material, metals and their alloys, or other synthetic materials. The specific dimensions, positions, orientations, configurations, etc. of any embedded member 30 and/or fixture 20 (including but not limited to features thereof such as troughs 22, boot recesses 24, etc.) in no way limits the scope of the present disclosure. Although the various elements shown in the drawings and described herein are pictured to scale for a specific part 10, those elements may be differently configured for fabrication of a different part 10 without departing from the scope of the present disclosure.

Figure 2:
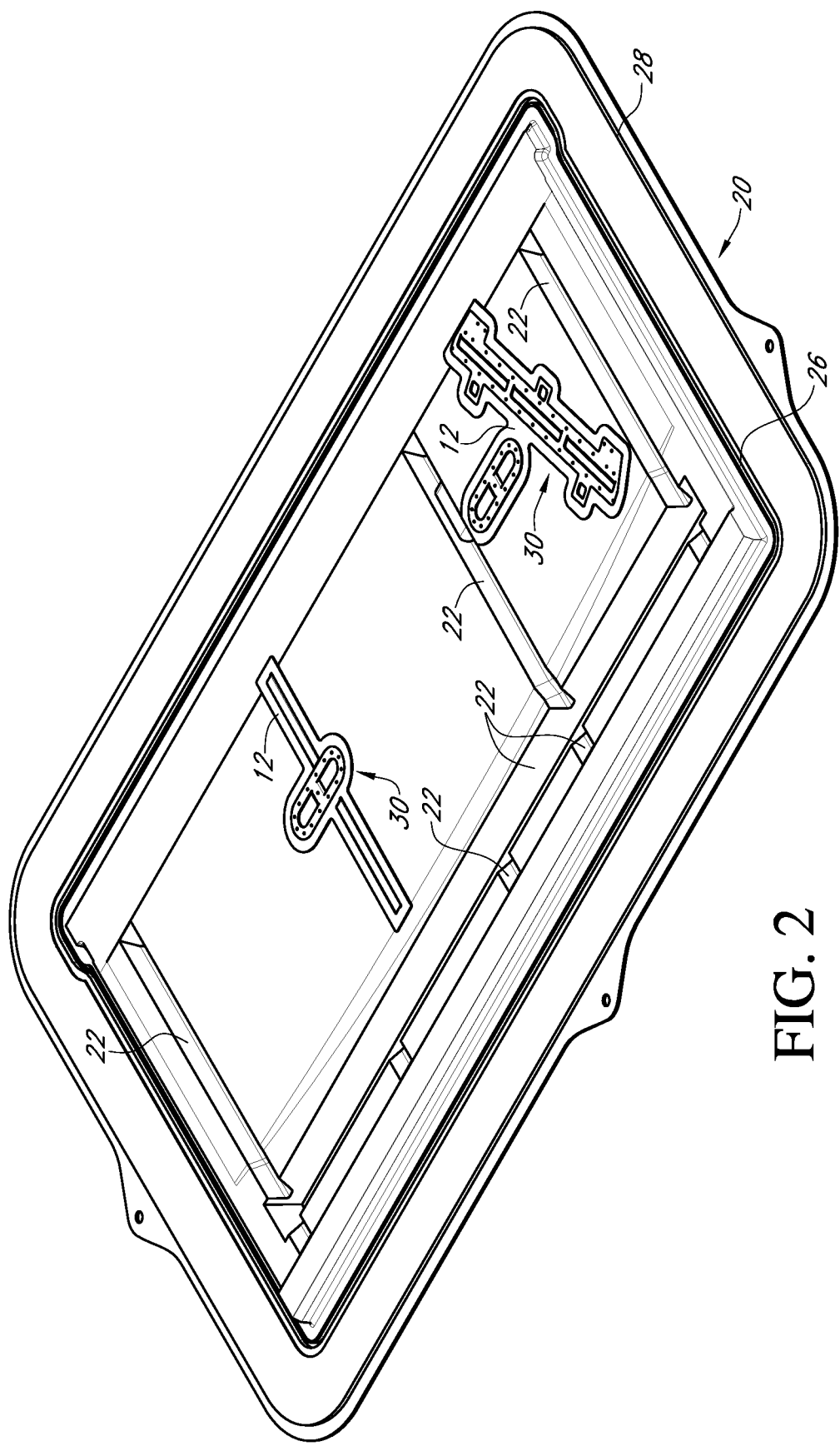
FIG. 2 is a perspective view of the fixture shown in FIG. 1 with a plurality of embedded members engaged therewith.
Figure 3:
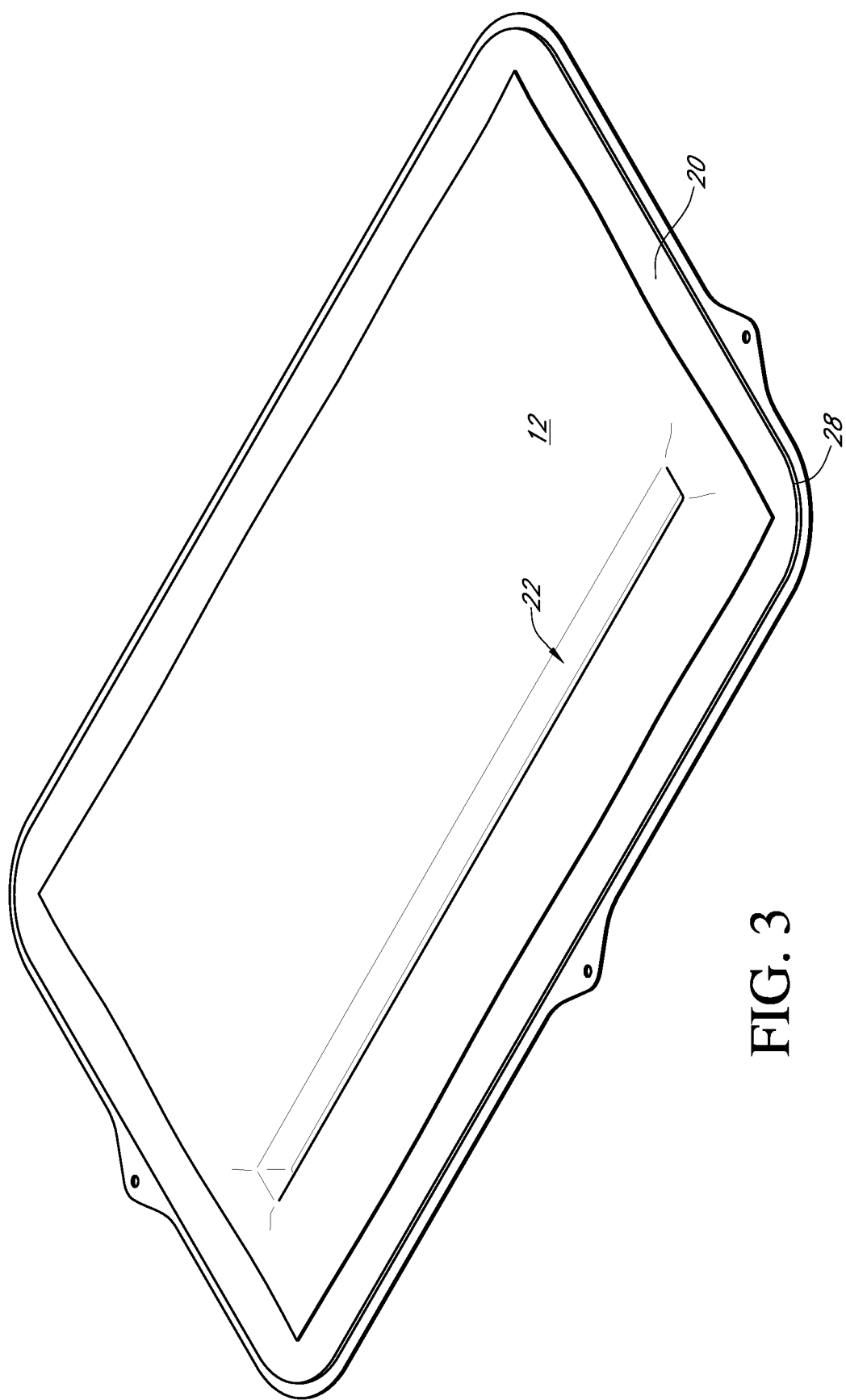
FIG. 3 is a perspective view of the fixture shown in FIGS. 1 & 2 with a first layer of substrate lay-up positioned over the plurality of the embedded members shown in FIG. 2.

In the illustrative embodiment, one or more embedded members 30 (some of which may have substrate lay-up placed adjacent one or more surfaces of the embedded member 30) may be positioned with respect to the fixture 20 via the boots 38 and boot recess 24, which is shown in FIG. 2. Next, a first layer of substrate lay-up 12 may be placed over the fixture 20 as shown in FIG. 3. In the illustrative embodiment of a part 10 as shown herein, it is contemplated that the surface of the part 10 that abuts the surface of the fixture 20 shown in FIG. 1 may constitute the B side of the part 10. However, the scope of the present disclosure is not so limited and extends to any surface of a part 10 constituting either the A side or B side.

Figure 4:
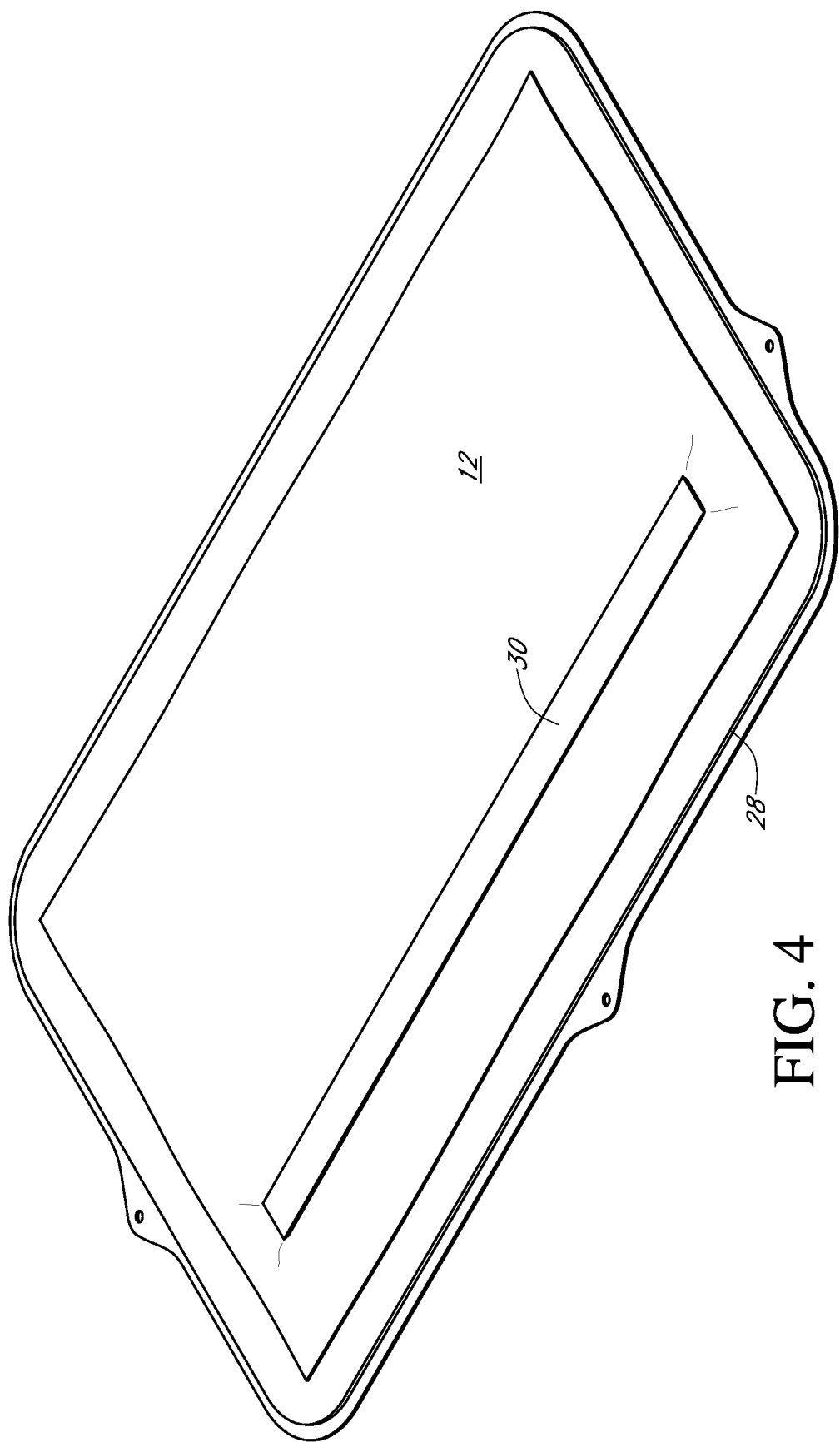
FIG. 4 is a perspective view of the fixture shown in FIGS. 1-3 with an embedded member positioned on top of the first layer of substrate lay-up.
Figure 5:
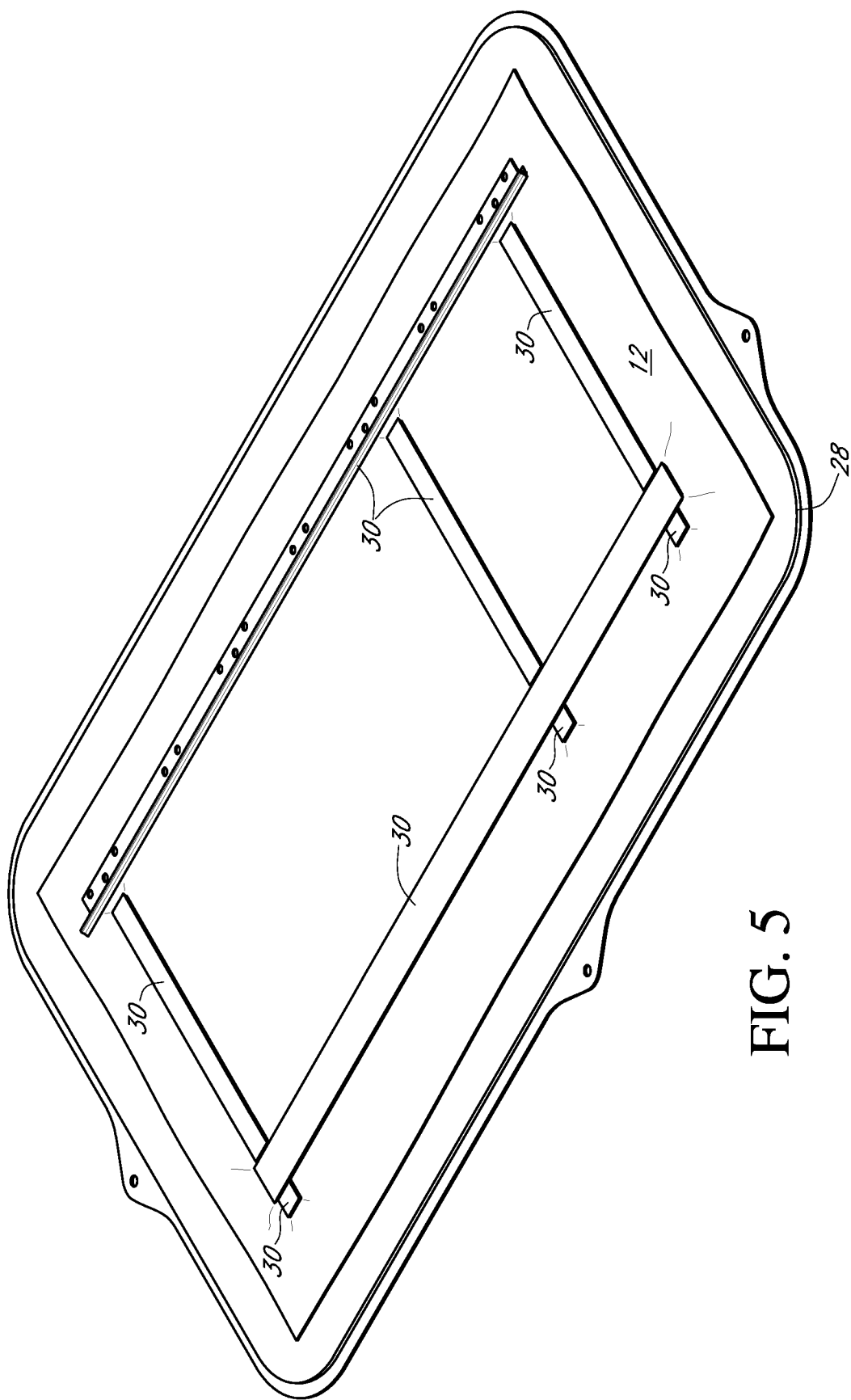
FIG. 5 is a perspective view of the fixture shown in FIGS. 1-4 with a second plurality of embedded members positioned on top of the first layer of substrate lay-up.

One or more additional embedded members 30 may be positioned with respect to the fixture 20 via one or more troughs 22 or other features formed in the fixture 20, as best shown in FIGS. 4 & 5. In the illustrative embodiment of a part 10, the embedded members 30 positioned in troughs 22 atop a first layer of substrate lay-up 12 may be constructed of a polymeric material, such as a synthetic foam (including but not limited to polystyrene, polypropylene, etc.) or other synthetic materials. However, as previously mentioned, the specific material of construction and/or configuration of any embedded member 30 in no way limits the scope of the present disclosure.

Figure 6:
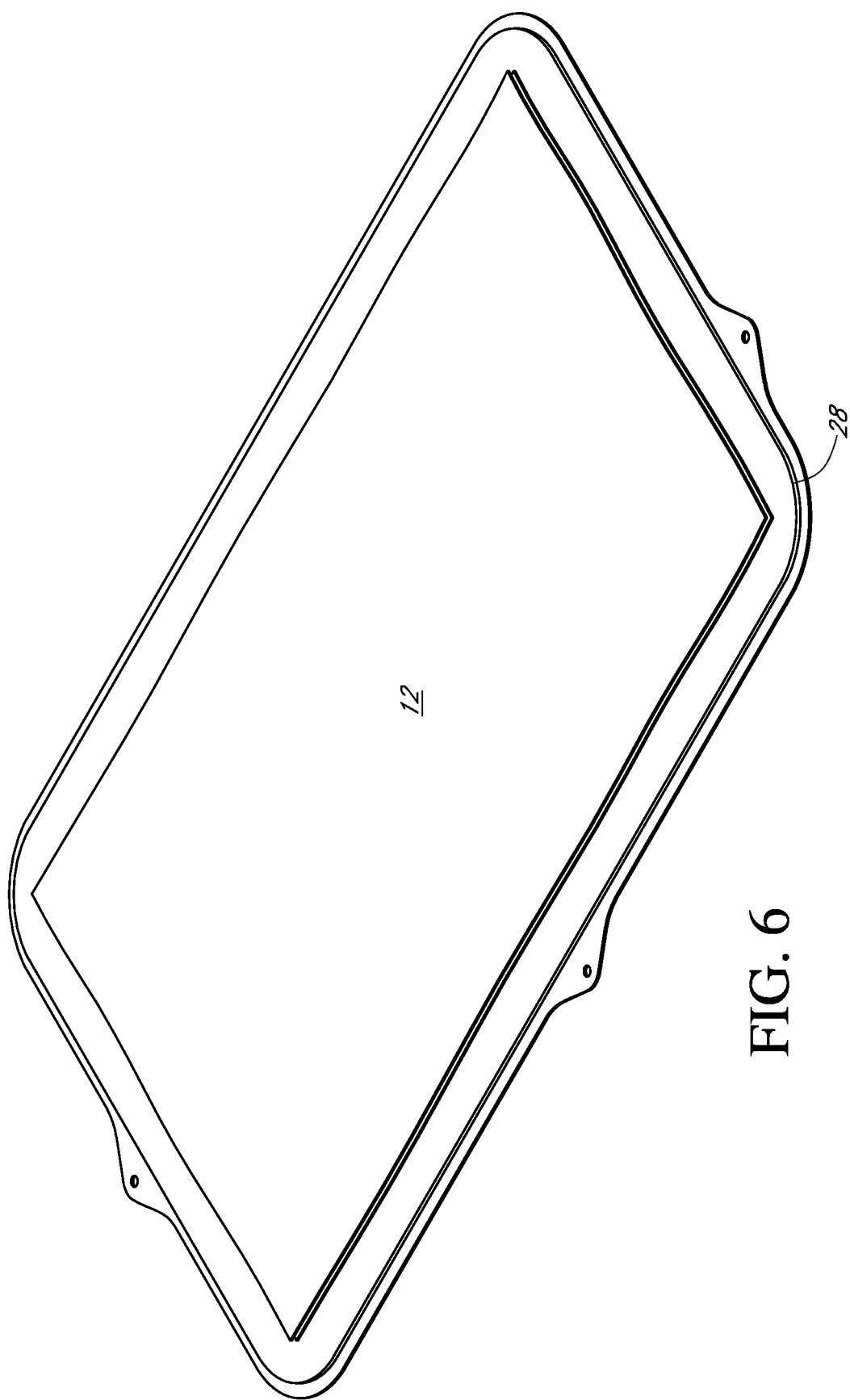
FIG. 6 is a perspective view of the fixture shown in FIGS. 1-5 with a second layer of substrate lay-up positioned over the second plurality of embedded members.

At this point, additional substrate lay-up 12 may be strategically positioned adjacent the first layer of substrate lay-up and/or embedded members 30. The positions of this additional substrate lay-up 12 will vary from one embodiment of a part 10 to the next, but in some embodiments the additional substrate lay-up 12 generally may be placed in areas of the part 10 that may need additional strength due to service factors. For example, in the illustrative embodiment of a part 10 it may be advantageous to place additional substrate lay-up adjacent one or more boot recesses 24. Finally, a second layer of substrate lay-up 12 may be positioned over the various embedded members 30 and/or additional substrate lay-up 12 to provide a smooth surface, as best shown in FIG. 6.

Figure 9B:
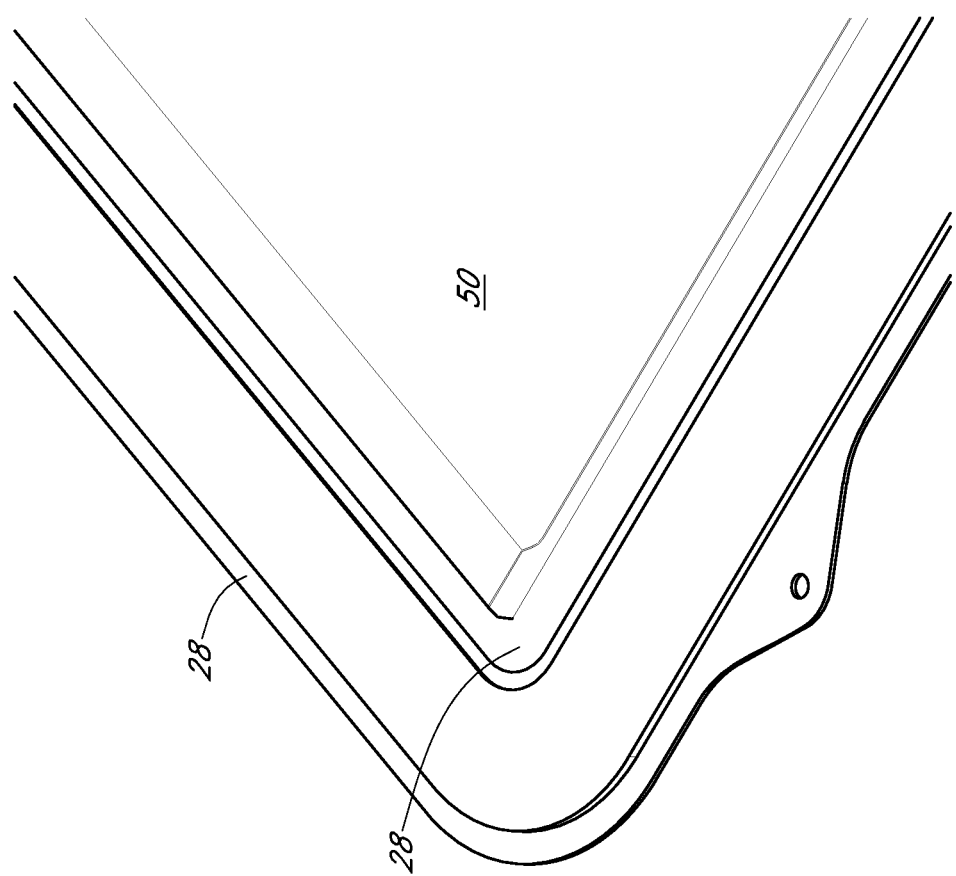
FIG. 9B is a detailed perspective view of a portion of the fixture shown in FIG. 9A.
Figure 10:
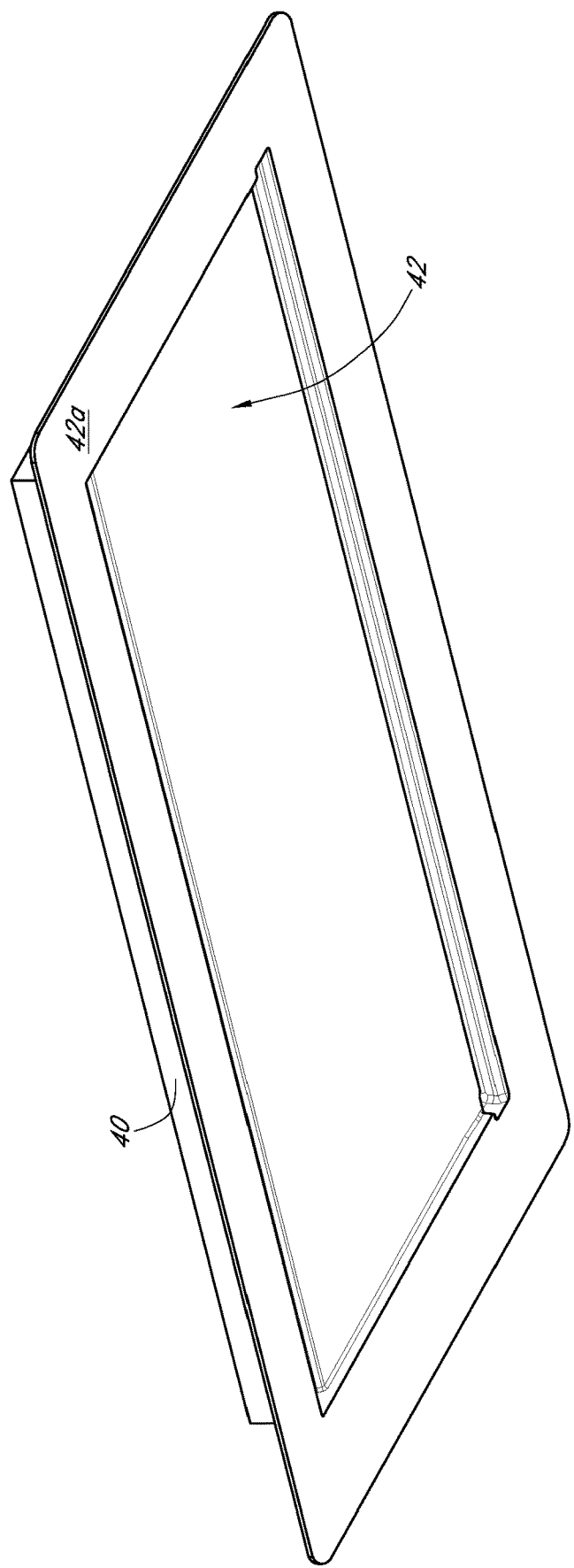
FIG. 10 is a perspective view of the interior portion of one embodiment of a cover that may be used with the illustrative embodiment of a fixture as disclosed herein.

After all required embedded members 30 and substrate lay-up 12 for a specific part 10 have been positioned on the fixture 20, an outer member 50 may be placed over the substrate lay-up 12. The outer member 50 may be formed with a flange 52 around the periphery thereof, as shown in FIGS. 9B & 12. It is contemplated that in the illustrative embodiment it may be desirable for the periphery of the flange 52 to extend beyond the periphery of the final layer of substrate lay-up 12 so that the area of the flange 52 void of any substrate lay-up 12 may form a resin gallery. Such a configuration may also serve to prevent resin from contacting the exterior portion of the outer member 50, which may be required to meet certain aesthetic standards for the part 10, which standards may be especially important on the A side thereof. The flange 52, as shown in FIG. 9B, may extend to and/or slightly beyond an inner seal 26 of the fixture 20. The fixture 20 may also include an outer seal 28 beyond the inner seal 26 such that the periphery of the flange 52 may be positioned somewhere between the inner and outer seals 26, 28. In the illustrative embodiment, the substrate lay-up 12 may be positioned such that no substrate lay-up 12 is positioned beyond the inner seal 26 so as to facilitate the resin gallery. Consequently, the interface between the inner seal 26 and flange 52 may serve to prevent resin 14 from extending outward being that interface (i.e., to the outer seal 28).

After the outer member 50 has been properly positioned with respect to the fixture 20, a cover 40 may be placed over the outer member 50. The cover 40 interior surface 42 may be positioned adjacent the outer member 50. The cover 40 may be formed with a sealing portion 42a around the periphery thereof. The sealing portion 42a may correspond to the inner and outer seals 26, 28 of the fixture 20. Accordingly, when the cover 40 is positioned over the outer member 50, a vacuum pump fluidly connected to the area of the fixture 20 between the inner and outer seals 26, 28 may be used to urge the cover 40 toward the fixture 20, thereby sealing the space between the fixture 20 and the cover 40 from the external environment. Part of the sealing portion 42a may also engage the flange 52 of the outer member 50.

A vacuum pump (not shown) fluidly connected to the fixture 20 at an area between the inner and outer seals 26, 28 may be configured to provide a predetermined amount of vacuum force to that area (e.g., 15 psi less than ambient), which may be referred to as a first zone. Using plumbing (for example, such fluid handling elements that include but are not limited to pipes, tubes, fittings, etc.), the same vacuum pump may be fluidly connected to the fixture 20 interiorly with respect to the inner seal 26 and provide a different predetermined amount of vacuum force to that area (e.g., 10 psi less than ambient), which may be referred to as a second zone. Alternatively, different vacuum pumps and associated plumbing may be used to provide the desired pressure to either the first and/or second zones. Accordingly, the specific plumbing configuration, vacuum pumps, or amount of vacuum force in no way limits the scope of the present disclosure. It is contemplated that in some embodiments, the vacuum required for the first zone will simply serve to ensure that the cover 40 and fixture 20 remain properly positioned and sealed with respect to one another.

It is contemplated that for certain embodiments, it may be preferable for the vacuum pump connection for the second zone to be near the center of the fixture 20, such that after resin 14 is introduced, it migrates relatively evenly to that point. However, the optimal placement of the vacuum pump connection in either the first or second zones, and/or the number of vacuum pump connections in either the first or second zones will vary at least depending on the part 10 fabricated.

Figure 11:
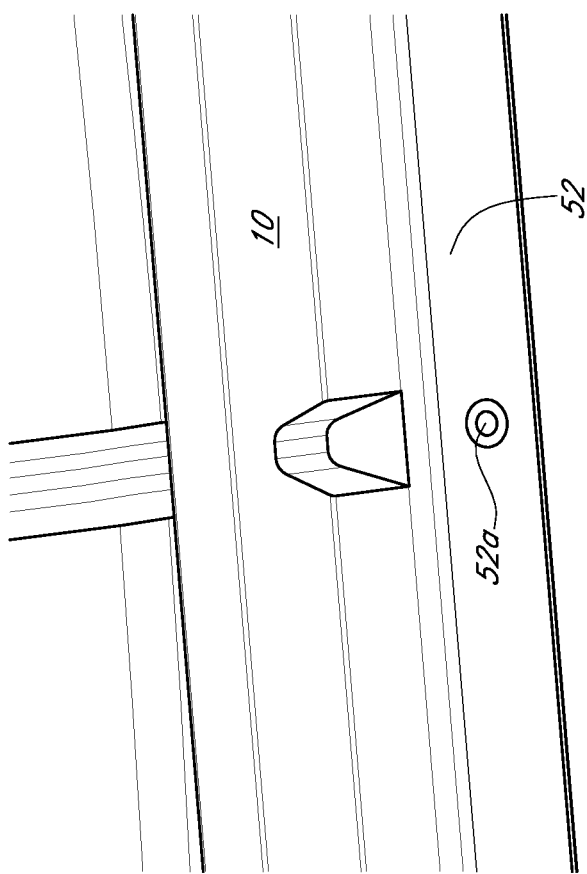
FIG. 11 is a detailed perspective view of a portion of the flange of the outer member after resin has been introduced to the substrate lay-up and cured.

Once the desired amount of vacuum has been achieved in the first and second zones, resin 14 may be introduced into the second zone via an inlet 23 formed in the fixture 20 adjacent to but interior with respect to the inner seal 26. It is contemplated that for certain parts 10, it may be beneficial to introduce the resin 14 adjacent the periphery of the part 10. In the illustrative embodiment, the resin 14 may be introduced in an area adjacent but interior with respect to the inner seal 26 such that the resin 14 is introduced adjacent the flange 52. A detailed view of one embodiment of a flange 52 and inlet location 52a for resin 14 is shown in FIG. 11. It is contemplated that no (or very little) substrate lay-up 12 may be positioned in the area in which resin 14 is introduced and around the periphery of the fixture 20 to facilitate rapid migration of resin 14 around the periphery of the fixture 20 to form a resin gallery.

From the resin gallery, it is contemplated that a pressure gradient in the second zone (which may be the result of a vacuum pump in fluid communication with the second zone) may be used to cause resin 14 to flow into the substrate lay-up 12 at a relatively even rate and with a relatively even volume distribution until resin 14 has contacted all or very nearly all substrate lay-up 12 positioned in the second zone. It is contemplated that the vacuum within the second zone may be focused at one or more suction points, which suction points may be in fluid communication with a vacuum pump with the second zone. It is further contemplated that the magnitude of the vacuum may be generally greater at these suction points, and that they may be positioned distant with respect to the inlet 23, such that resin 14 positioned in the resin gallery must traverse the maximum portion of the fixture 20 possible before reaching a suction point.

In the illustrative embodiment of a part 10, the after the resin 14 has cured the area of the flange 52 adjacent the inlet 23 generally may constitute a portion of the resin gallery, which may be sacrificial to the part 10 and removed during finishing. It is contemplated that during the curing process, the temperature of the fixture 20 and/or cover 40 may be controlled for optimal strength of the resulting part 10. This will often require cooling of the fixtures 20 and/or cover 40, but the present disclosure is not so limited.

Figure 15:
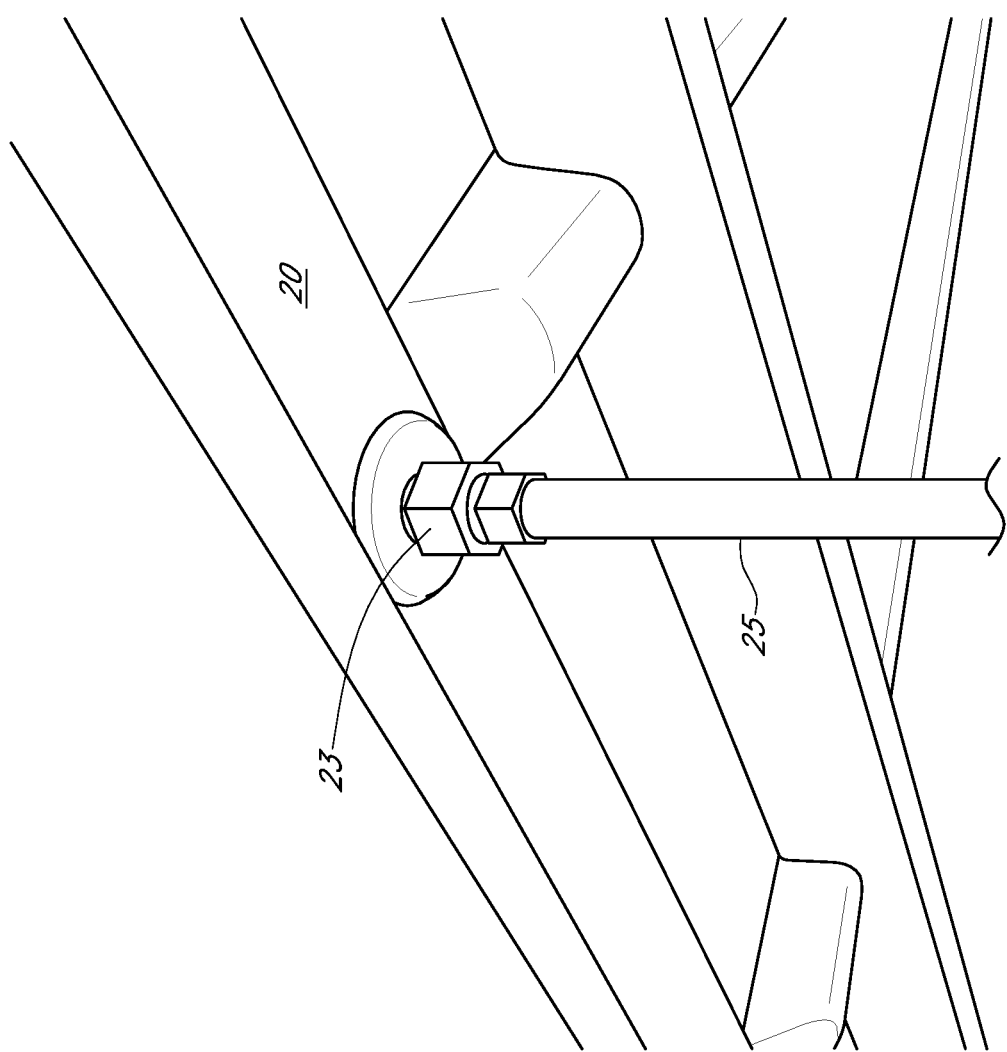
FIG. 15 is a detailed perspective view of a portion of the embodiment of a fixture shown in FIGS. 1-6 adjacent the inlet.

One illustrative embodiment of an inlet 23 for a fixture 20 is shown in FIG. 15, wherein the inlet 23 is shown fluidly connected to a hose 25. The opposite end of the hose 25 may be in fluid communication with a resin supply (not shown) such that reduced pressure in the second zone of the fixture 20 causes resin 14 to migrate through the hose 25 and into the inlet 23, whereby the resin 14 may migrate to a resin gallery, which resin gallery may be generally adjacent to the inner seal 26 but interior with respect thereto.

Figure 14:
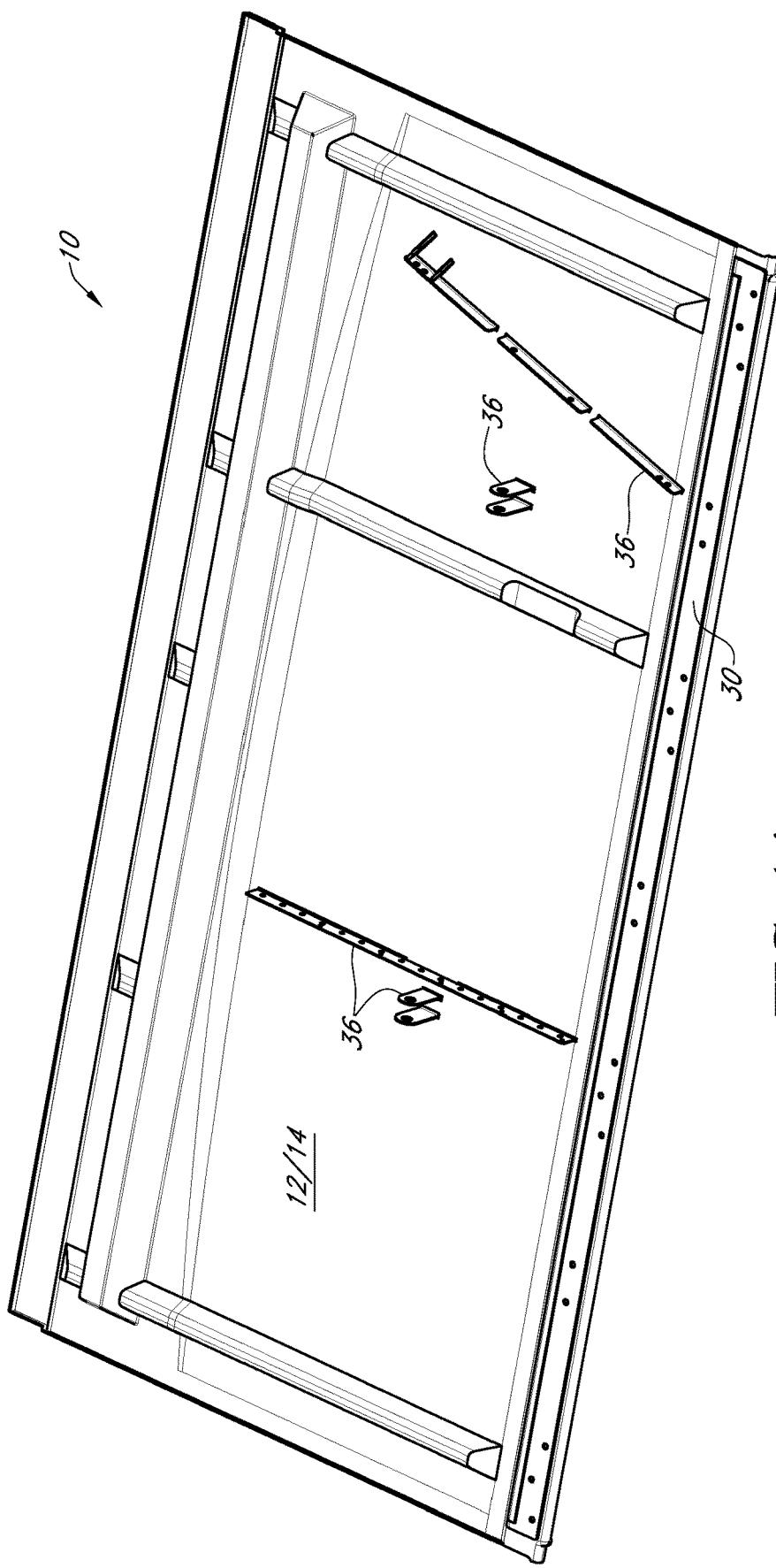
FIG. 14 is a perspective view of a first side of part having a plurality of embedded members extending therefrom.

After the part 10 has adequately cured and cooled, the vacuum may be removed from the first and second zones and the cover 40 may be removed from the fixture 20. The part 10 may then be removed from the fixture 20 and the boots 38 may be removed from any embedded member 30. Accordingly, the present disclosure provides an apparatus and method to form reinforced polymer parts 10 with embedded members 30 accurately positioned within the part 10 in a repeatable and precise manner. An illustrative embodiment of the B side of a part 10 (i.e., the surface of the part 10 without the outer member 50) is shown in FIG. 14, wherein the sacrificial portion of the flange 52 has been removed. The B side generally may be the surface of the part 10 that is adjacent the fixture 20 during fabrication. From FIG. 14 one may clearly observe a plurality of extending portions 36 extending outward from the substrate lay-up 12/resin 14 medium. The substrate lay-up/resin 14 medium may constitute the majority of the volume and/or weight of the part 10 so as to constitute a body of the part 10, and may chemically bond/fuse to an interior surface of the outer member 50.

The embedded members 30 may be any structure suitable for the particular part 10 and constructed of any suitable material. An embedded member 30 may provide robust connection points for other structures, such as bolts, rods, actuators, and/or other components. The resin 14 may be colored so that the resultant part 10 is uniform or relatively uniform in color on both the side formed with substrate lay-up 12 and resin 14 (the B side) and the side comprising the outer member 50 (the A side). Additionally, because the outer member 50 may be formed separately and later fused and/or bonded to the substrate lay-up 12/resin 14, the outer member 50 may be formed with nearly an aesthetic feature needed for the A side of the finished part 10. For example, the outer member 50 may be formed with a specific texture (e.g., simulated wood grain, glossy metallic finish, matte finish, etc.), pattern (embossed logo, recessed features, smooth and/or embedded patterns, etc.), and/or a specific color and/or set of colors. Accordingly, the scope of the present disclosure is in no way limited by the specific configuration of the outer member 50 and/or A side of the finished part 10.

It should be noted that the part 10, fixture 20, embedded member 30, cover 40 and/or outer member 50 are not limited to the specific embodiments pictured and described herein, but are intended to apply to all similar apparatuses and methods for providing the various benefits of those elements. Modifications and alterations from the described embodiments will occur to those skilled in the art without departure from the spirit and scope of the present disclosure.

The present disclosure provides numerous advantages over the prior art, including but not limited to decreased time required to fabricate a part 10. By way of illustration, a fiberglass reinforced polymer part fabricated according to the prior art typically requires applying a gel coat to a mold and waiting for the gel coat to cure before placing substrate lay-up 12 on the gel coat. Accordingly, the mold is occupied the entire time the gel coat is curing. However, with the present method there is no need for gel coat, and therefore no time required in the fabrication of the part 10 is expended on the curing of a gel coat. Another advantage to not requiring a gel coat is that a stock of outer members 50 may be on hand, such that variances in supply of outer members 50 need not affect production rates of parts 10.

Furthermore, variations and modifications of the foregoing are within the scope of the present disclosure. It is understood that the present disclosure extends to all alternative combinations of two or more of the individual features mentioned or evident from the text and/or drawings. All of these different combinations constitute various alternative aspects of the present disclosure. The embodiments described herein explain the best modes known for practicing the present disclosure and will enable others skilled in the art to utilize the same. The claims are to be construed to include alternative embodiments to the extent permitted by the prior art.

Having described the preferred embodiment, other features, advantages, and/or efficiencies of the present disclosure will undoubtedly occur to those versed in the art, as will numerous modifications and alterations of the disclosed embodiments and methods, all of which may be achieved without departing from the spirit and scope of the present disclosure. It should be noted that the present disclosure is not limited to the specific embodiments pictured and described herein, but are intended to apply to all similar apparatuses and/or methods for making a part 10. Modifications and alterations from the described embodiments will occur to those skilled in the art without departure from the spirit and scope of the present disclosure.

The invention claimed is:

1. A part comprising:
   a. a body having a first exterior surface, wherein a portion of said first exterior surface is formed of a cured substrate lay-up/resin medium;
   b. an embedded member comprising:
      i. a frame;
      ii. an extending portion connected to and extending outward from said frame, wherein a portion of said frame is positioned in said body, and wherein a portion of said extending portion extends outward from said body on said first exterior surface; and,
   c. an outer member engaged with said body, wherein said outer member is positioned on a surface of said body opposite said first exterior surface.

2. The part according to claim 1 wherein said embedded member further comprises an ear, wherein said ear extends from said frame in a direction different from a direction in which said extending portion extends, and wherein said ear is positioned in said body.

3. The part according to claim 1 further comprising a second embedded member, said second embedded member comprising a frame and an extending portion connected to and extending outward from said frame, wherein a portion of said frame is positioned in said body, and wherein a portion of said extending portion extends outward from said body on said first exterior surface.

4. The part according to claim 1 wherein said outer member further comprises a flange formed around the periphery of said outer member.

5. The part according to claim 3 further comprising a third embedded member, wherein said third embedded member is entirely positioned within said body.

6. The part according to claim 1 further comprising an opening in a first fiberglass sheet configured as a substrate lay-up, the first fiberglass sheet adjacent a first side of a frame of the embedded member.

7. The part according to claim 1 further comprising an opening in a first fiberglass sheet configured as a substrate lay-up, the first fiberglass sheet adjacent a first side of a frame of the embedded member, wherein said embedded member is formed of a metallic material.

8. The part according to claim 1 further comprising:
   a. an opening in a first fiberglass sheet configured as a substrate lay-up, the first fiberglass sheet adjacent a first side of a frame of the embedded member, wherein said embedded member is formed of a metallic material;
   b. an extending portion of said embedded member configured to pass through said opening in said first fiberglass sheet; and
   c. a boot positioned around said extending portion of said embedded member.

9. The part according to claim 1 further comprising:
   a. an opening in a first fiberglass sheet configured as a substrate lay-up, the first fiberglass sheet adjacent a first side of a frame of the embedded member, wherein said embedded member is formed of a metallic material;
   b. an extending portion of said embedded member configured to pass through said opening in said first fiberglass sheet;
   c. a boot positioned around said extending portion of said embedded member;
   d. said embedded member located with respect to a fixture via engagement between said boot and a corresponding boot recess formed in said fixture;
   e. a second fiberglass sheet placed on said fixture, wherein said frame of said embedded member is positioned between said first fiberglass sheet and said second fiberglass sheet;
   f. an outer member positioned over said second fiberglass sheet;
   g. a cover positioned over said outer member, wherein said cover and said fixture are configured to seal an area therebetween from an external environment, and wherein said cover is formed of a synthetic material;
   h. a pressure within said area between said cover and said fixture is configured to be an amount less than ambient pressure; and
   i. a resin introduced into said area between said cover and said fixture.

* * * * *